United States Patent
Kirshon

(10) Patent No.: US 12,308,959 B2
(45) Date of Patent: May 20, 2025

(54) APPLICATION-LEVEL FORWARD ERROR CORRECTION TECHNIQUES

(71) Applicant: Ottopia Technologies Ltd., Tel Aviv (IL)

(72) Inventor: Alexander Kirshon, Netanya (IL)

(73) Assignee: Ottopia Technologies Ltd., Tel Aviv (IL)

( * ) Notice: Subject to any disclaimer, the term of this patent is extended or adjusted under 35 U.S.C. 154(b) by 55 days.

(21) Appl. No.: 18/538,444

(22) Filed: Dec. 13, 2023

(65) Prior Publication Data

US 2025/0080270 A1 Mar. 6, 2025

Related U.S. Application Data

(60) Provisional application No. 63/579,870, filed on Aug. 31, 2023.

(51) Int. Cl.
*H04L 1/00* (2006.01)

(52) U.S. Cl.
CPC .................. *H04L 1/0041* (2013.01)

(58) Field of Classification Search
CPC ..... H04L 1/004; H04L 1/0009; H04L 1/0041; H04L 1/0057; H03M 13/15; H03M 13/31; H03M 13/29; H03M 13/1515; H03M 13/2906

See application file for complete search history.

(56) References Cited

U.S. PATENT DOCUMENTS

| | | |
|---|---|---|
| 7,676,735 B2 | 3/2010 | Luby et al. |
| 8,006,160 B2 | 8/2011 | Chen et al. |
| 8,804,761 B2 | 8/2014 | Grilli et al. |
| 9,013,989 B2 | 4/2015 | Yonge, III et al. |
| 9,288,010 B2 | 3/2016 | Luby |
| 9,300,602 B2 | 3/2016 | Sampath et al. |
| 9,819,726 B2 | 11/2017 | Pazos et al. |
| 2013/0294447 A1* | 11/2013 | Myung ............ H04L 69/22 370/389 |
| 2021/0314086 A1* | 10/2021 | Ansari ............ H03M 13/31 |
| 2024/0364451 A1* | 10/2024 | Aziz ............ H04L 1/0009 |

FOREIGN PATENT DOCUMENTS

| | | |
|---|---|---|
| CN | 1868157 A | 11/2006 |
| WO | 2005022812 A1 | 3/2005 |

* cited by examiner

*Primary Examiner* — Shelly A Chase
(74) *Attorney, Agent, or Firm* — M&B IP Analysts, LLC

(57) ABSTRACT

Techniques for performing and improving forward error correction (FEC). In an embodiment, a set of base data is grouped into a plurality of base data groups, for example when a trigger event which triggers beginning or altering transmission of FEC data occurs. FEC data including a plurality of FEC data groups is generated based on the plurality of base data groups, where each FEC data group corresponds to a respective base data group of the plurality of base data groups and each FEC data group is redundant with at least a portion of the corresponding base data group. The plurality of FEC data groups are transmitted. Various techniques described herein leverage different connections, links, devices, or combinations thereof, for transmitting FEC data and base data.

21 Claims, 11 Drawing Sheets

APPLICATION-LEVEL FORWARD ERROR CORRECTION TECHNIQUES

CROSS-REFERENCE TO RELATED APPLICATIONS

This application claims the benefit of U.S. Provisional Patent Application No. 63/579,870 filed on Aug. 31, 2023, the contents of which are hereby incorporated by reference.

TECHNICAL FIELD

The present disclosure relates generally to forward error correction, and more specifically to techniques for forward error correction at the application level.

BACKGROUND

Forward error correction (FEC) refers to a type of technique used for controlling errors in data transmission, particularly when transmitting data over unreliable or noisy communication channels. FEC techniques utilize encoding schemes which encode data in a manner which is redundant in order to allow for detecting and/or correcting errors in transmitted data.

Error correction code (ECC), also referred to as error correcting code, is defined such that it produces redundant sets of data based on an original set to be transmitted. Some types of error correcting code include block codes which encode data in blocks of fixed size and convolutional codes which generate parity symbols for bit or symbol streams of arbitrary length. ECC provides redundant bits of data which may be utilized to detect errors in the data when transmitted, and may also be utilized to fix any detected errors by reconstructing part of the data.

Some of these existing solutions allow for correcting errors. However, many existing solutions perform less efficiently when using heuristic analyses to determine appropriate ECC methodologies or other FEC techniques to apply. Additionally, some FEC techniques are applied at the physical (hardware level). These techniques face challenges in successfully recovering data under certain parameters. In particular, errors often come in chunks when such solutions are utilized. This may result in failure to recover data from those chunks unless a very high volume of FEC data is being sent.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for forward error correction. The method comprises: detecting a trigger event; grouping a set of base data into a plurality of base data groups based on the detected trigger event and a set of contextual data indicating at least one transmission-affecting circumstance; generating forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and transmitting the plurality of FEC data groups.

Certain embodiments disclosed herein also include a non-transitory computer readable medium having stored thereon causing a processing circuitry to execute a process, the process comprising: detecting a trigger event; grouping a set of base data into a plurality of base data groups based on the detected trigger event and a set of contextual data indicating at least one transmission-affecting circumstance; generating forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and transmitting the plurality of FEC data groups.

Certain embodiments disclosed herein also include a system for forward error correction. The system comprises: a processing circuitry; and a memory, the memory containing instructions that, when executed by the processing circuitry, configure the system to: detecting a trigger event; grouping a set of base data into a plurality of base data groups based on the detected trigger event and a set of contextual data indicating at least one transmission-affecting circumstance; generating forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and transmitting the plurality of FEC data groups.

Certain embodiments disclosed herein include the method, non-transitory computer readable medium, or system noted above or below, wherein the FEC data is generated based further on the set of contextual data.

Certain embodiments disclosed herein include the method, non-transitory computer readable medium, or system noted above or below, wherein detecting the trigger event further comprises: analyzing at least one network performance measurement in order to detect an abnormality in network performance.

Certain embodiments disclosed herein include the method, non-transitory computer readable medium, or system noted above or below, wherein at least a portion of the base data is generated by a first software component, wherein at least a portion of the FEC data is generated by a second software component.

Certain embodiments disclosed herein include the method, non-transitory computer readable medium, or system noted above or below, wherein each of the first software component and the second software component is a process.

Certain embodiments disclosed herein include the method, non-transitory computer readable medium, or system noted above or below, further including or being configured to perform the following step or steps: transmitting the plurality of base data groups, wherein each FEC group is transmitted via a different channel than the corresponding base data group.

Certain embodiments disclosed herein include the method, non-transitory computer readable medium, or system noted above or below, further including or being configured to perform the following step or steps: compressing the plurality of base data groups in order to create a plurality of respective compressed data groups, wherein the plurality of FEC data groups are generated based further on the plurality of compressed data groups such that each FEC data group is redundant with at least a portion of the respective compressed data group of the corresponding base data group.

Certain embodiments disclosed herein include the method, non-transitory computer readable medium, or system noted above or below, further including or being configured to perform the following step or steps: assigning a group identifier to each of the plurality of base data groups, wherein the plurality of FEC data groups is generated based further on the group identifiers.

Certain embodiments disclosed herein include the method, non-transitory computer readable medium, or system noted above or below, wherein the plurality of FEC data groups is transmitted over at least one first connection, wherein the plurality of base data groups is transmitted over at least one second connection, the at least one first connection having a first attribute of a type of attribute, the at least one second connection having a second attribute of the type of attribute, wherein at least the base data is grouped based on the first attribute of the at least one first connection and the second attribute of the at least one second connection.

Certain embodiments disclosed herein include the method, non-transitory computer readable medium, or system noted above or below, wherein each second connection has a predetermined limit on an amount of data transmitted via the second connection in a given time period.

Certain embodiments disclosed herein include the method, non-transitory computer readable medium, or system noted above or below, wherein the plurality of FEC data groups is transmitted over at least one first network device, wherein at least a portion of the plurality of base data groups is transmitted over at least one second network device.

Certain embodiments disclosed herein include the method, non-transitory computer readable medium, or system noted above or below, wherein each first network device transmits data with a higher latency than each second network device.

Certain embodiments disclosed herein include the method, non-transitory computer readable medium, or system noted above or below, wherein each first network device transmits data with a lower latency than each second network device.

Certain embodiments disclosed herein include the method, non-transitory computer readable medium, or system noted above or below, wherein the FEC data is utilized to construct at least a first portion of the base data while at least a second portion of the base data is still in transit.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
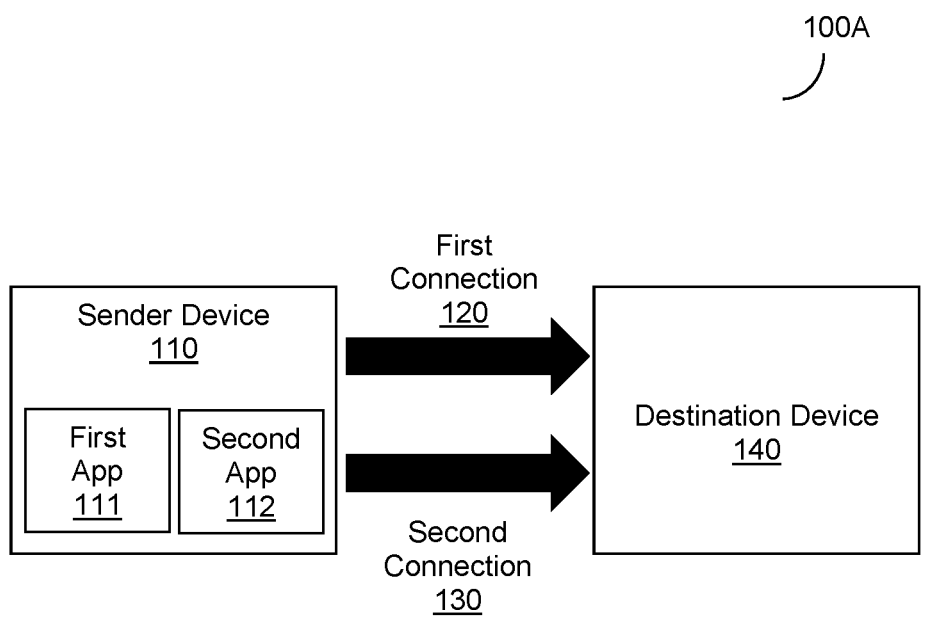
FIGS. 1A-C are network transmission diagrams utilized to describe various disclosed embodiments.

The disclosed embodiments include various techniques for forward error correction (FEC) and, in particular, techniques for FEC which may be performed at the application level. The disclosed embodiments provide various improvements over existing solutions such as, but not limited to, improvements in latency and jitter, improvements in data transmission success rates, improvements in reconstructing data when errors are detected, and the like. Further, various embodiments disclosed herein may be treated orthogonally, that is, different disclosed methods may be utilized in combination as part of a broader FEC process in order to realize benefits from each of those methods. As a non-limiting example, one of the disclosed embodiments may be utilized in order to create the FEC data to be transmitted, and another of the disclosed embodiments may be utilized to transmit the FEC data.

In particular, some disclosed embodiments include techniques for generating FEC data, other disclosed embodiments include techniques for transmitting FEC data, and yet other disclosed embodiments include techniques for reconstructing data using FEC data. In accordance with any of these disclosed embodiments, FEC data may be utilized to reconstruct base data regardless of whether data loss or other errors are detected. In other words, in some embodiments, FEC data is utilized to reconstruct base data when data is still in transit in order to construct the full set of data even if no errors have been detected. This may allow, for example, receiving data sent at lower latency, thereby allowing for smoothing network traffic with respect to factors such as latency and jitter.

In accordance with various disclosed embodiments, FEC data is generated based on a set of base data and transmitted over one or more communication channels in addition to the base data. In an embodiment, the data is grouped, and FEC data is generated based on the groupings. In another embodiment, a packet grouping scheme is determined and utilized to assign group identifiers to packets, which in turn are grouped and used to generate FEC data. In yet another embodiment, base data and FEC data are transmitted over links of different communication channels. In yet another embodiment, FEC data is sent via a network device having a first latency status (e.g., either high latency or low latency), and some or all of the base data is sent via a network device having a different latency status. In yet another embodiment, FEC data is sent over a first connection and base data is sent over a second connection. In a further embodiment, the first connection used to send the FEC data is a non-metered connection and the second connection used to send the base data is a metered connection.

In accordance with various embodiments disclosed herein, FEC data is created based on a set of base data such that the FEC data is capable of being utilized to construct or reconstruct at least a portion of the base data. To this end, the FEC data includes data which is redundant with at least a portion of the base data. The FEC data may include, but is not limited to, error correcting code (ECC). As noted above, redundant data may be utilized to reconstruct portions of the base data having errors. Various disclosed embodiments may be utilized in order to improve creation and transmission of FEC data in order to improve efficiency or accuracy of reconstruction. As noted herein, various disclosed embodiments may utilize FEC data in order to smooth data transmission in order to reduce latency and jitter.

The disclosed embodiments include various FEC techniques which may be applied at the application level as opposed to, for example, techniques which are applied only at the hardware level. Optionally, applying FEC techniques at the application level may include generating base data and generating FEC data via different software components such as, but not limited to, processes, applications, and the like. To this end, some embodiments include generating at least a portion of FEC data based on base data, where at least some of the base data is generated by a first application or process and at least some of the FEC data is generated by a second application or process that is not the first application or process. In this regard, such a first application may provide supplemental features that may not be provided, for example, by a solution using FEC with real-time transport protocol (RTP) such as features designed to improve quality of service or to handle allocation and reservation of resources.

Figure 1B:
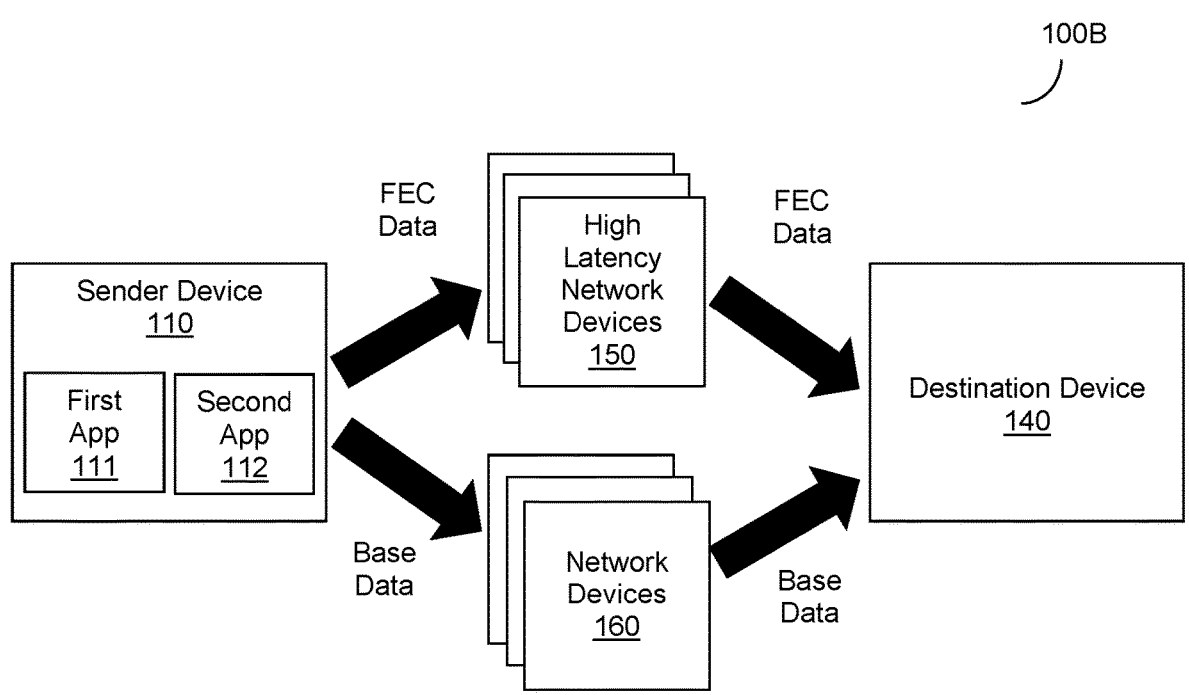

FIGS. 1A-B are network transmission diagrams 100A and 100B, respectively, utilized to describe various disclosed embodiments. In each of FIGS. 1A and 1B, a sender device 110 transmits both a first set of data ("data") and a second set of data to be used for forward error correction ("FEC data") to a destination device 140. More specifically, the FEC data may be created based on the first set of data, and may be utilized to at least partially reconstruct data of the first set of data in accordance with various disclosed embodiments. The first set of data may be an original set of data to be transmitted, a compressed set of data generated based on an original set of data, and the like. The destination device 140 can utilize the original data as well as the FEC data in order to provide improved data delivery on the destination end in accordance with various disclosed embodiments.

As depicted in FIG. 1A, the sender device 110 transmits data to the destination device 140 over at least a first connection 120 and a second connection 130. The connections 120 and 130 may be, but are not limited to, different links, different kinds of connections, connections having different limitations or other properties, combinations thereof, and the link.

In an embodiment, the sender device 110 is configured with software including at least a first software 111 and a second software 112. Each of the software 111 and 112 is a computer program or portion thereof such as, but not limited to, an application or process, including instructions for performing one or more tasks. In accordance with various disclosed embodiments, the second software 112 is at least configured to generate FEC data, and may be further configured to generate FEC data in accordance with one or more of the disclosed techniques. The second software 112 generates FEC data using base data. In various embodiments, at least some of the base data is generated by the first software 111 or by other software (not shown) either installed on the sender device 110 or on another device (not shown). Accordingly, in such an embodiment, at least some FEC data generated by the sender device 110 is generated by the second software 112 using a set of base data, where at least some of the base data used by the second software 112 to generate the FEC data originates from another software (e.g., the first software 111).

In an embodiment, the connections 120 and 130 are different links. In such an embodiment, the first set of data is sent over one of the connections (e.g., the connection 120) and the FEC data is sent over the other connection (e.g., the connection 130). In a further embodiment, the different links have different attributes of a same type of attribute. Non-limiting examples for different attributes of the same type include metered versus non-metered, different average latencies, different average jitter values, combinations thereof, and the like. In yet a further embodiment, connections may be monitored to detect when connections having different attributes of the same attribute type are being used such that the use of different attribute connections may be detected as a trigger event such that causes FEC data to begin being generated or otherwise triggers altering the scheme used for grouping the base data, for generating the FEC data, or both.

In another embodiment, the connections 120 and 130 are a metered connection and a non-metered connection, respectively. In such an embodiment, the first set of data may be sent over the metered connection 120, and the second set of FEC data may be sent over the non-metered connection 130. The metered connection 120 has a limit on the amount of data that may be transmitted, for example, in a given time period, while the non-metered connection 130 lacks limits on the amount of data that may be transmitted. Accordingly, a large amount of FEC data may be sent over the non-metered connection 130 in order to improve reconstruction of the first set of data as needed.

It should be noted that a single connection is illustrated for each of the first set of data and the second set of FEC data in FIG. 1A merely for simplicity purposes, and that additional connections may be utilized for each set of data without departing from at least some disclosed embodiments.

As depicted in FIG. 1B, the sender device 110 transmits data to the destination device 140 via a first set of one or more high latency network devices 150 and a second set of one or more other network devices 160. Each of the network devices 150 and 160 may be, but is not limited to, a modem or other device used for transmitting data over a network. The high latency network devices 150 may transmit data at lower rate or otherwise with higher latency than at least some of the network devices 160. In other words, in an embodiment, FEC data is transmitted over one or more network devices which transmit data with higher latency, and the other network devices which transmit data at lower latency may be utilized to transmit the base data for which the FEC data is to be used to reconstruct.

In an embodiment, FEC data is sent over the low latency network devices 170, while data which may be reconstructed using the FEC data is sent over the other network devices 160. In a further embodiment, the FEC data may be utilized to reconstruct portions of the data sent over the network devices 160 when such data is either incomplete or has otherwise not yet been received. In this regard, the FEC data and reconstruction using such FEC data may be utilized as a smoothing mechanism for network traffic in order to reduce latency and jitter, and further the FEC data may be used for smoothing regardless of whether errors are detected in data being received.

Figure 1C:
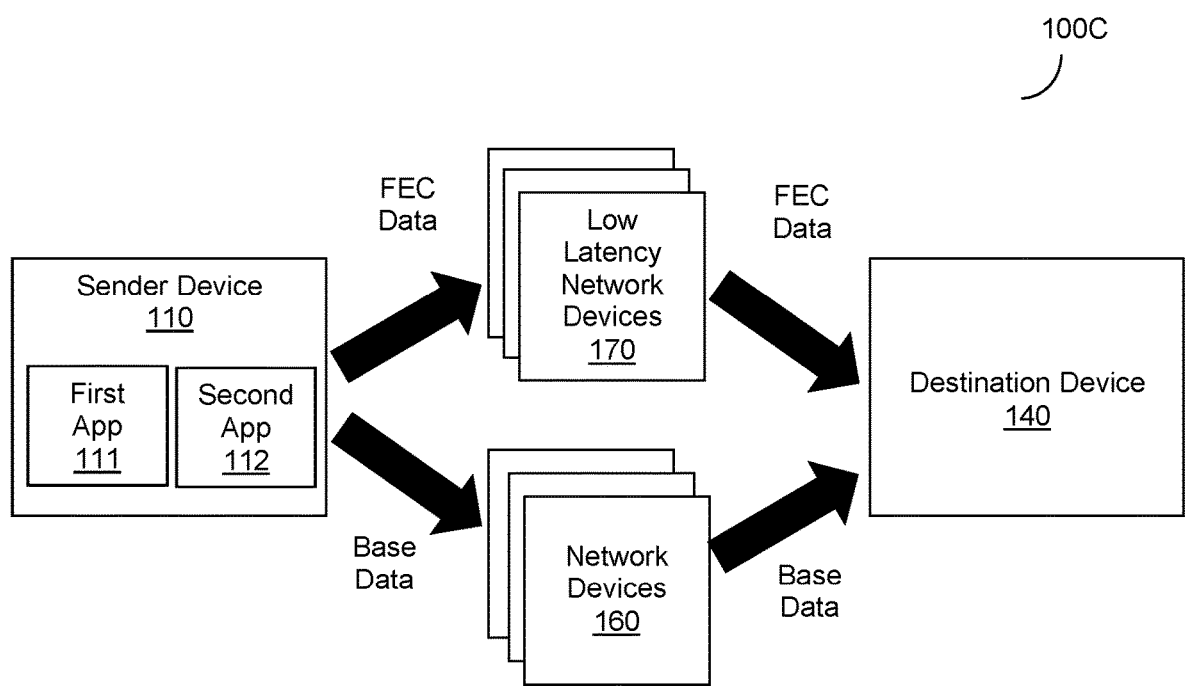

FIG. 1C shows another variation 100C of the implementation depicted in FIG. 1B. In FIG. 1C, the FEC data is sent via a low latency network device 170, and at least a portion of the base data is sent via the other network devices 160.

It should be noted that a single first software 111 and a single second software 112 are depicted in FIGS. 1A-C for simplicity purposes, but that at least some disclosed embodiments are not limited to generating FEC data via only one software component (e.g., an application or process) or using base data originating from only one other software component. Multiple software components may be utilized to generate FEC data, to generate base data, or both, without departing from the scope of the disclosure. Additionally, the second software 112 is depicted as being deployed in the sender device 110 merely for example purposes, and the software acting as the originator of at least a portion of the base data to be used for generating FEC data may be deployed elsewhere (e.g., in another device or system, not shown) without departing from the scope of the disclosure.

Figure 2:
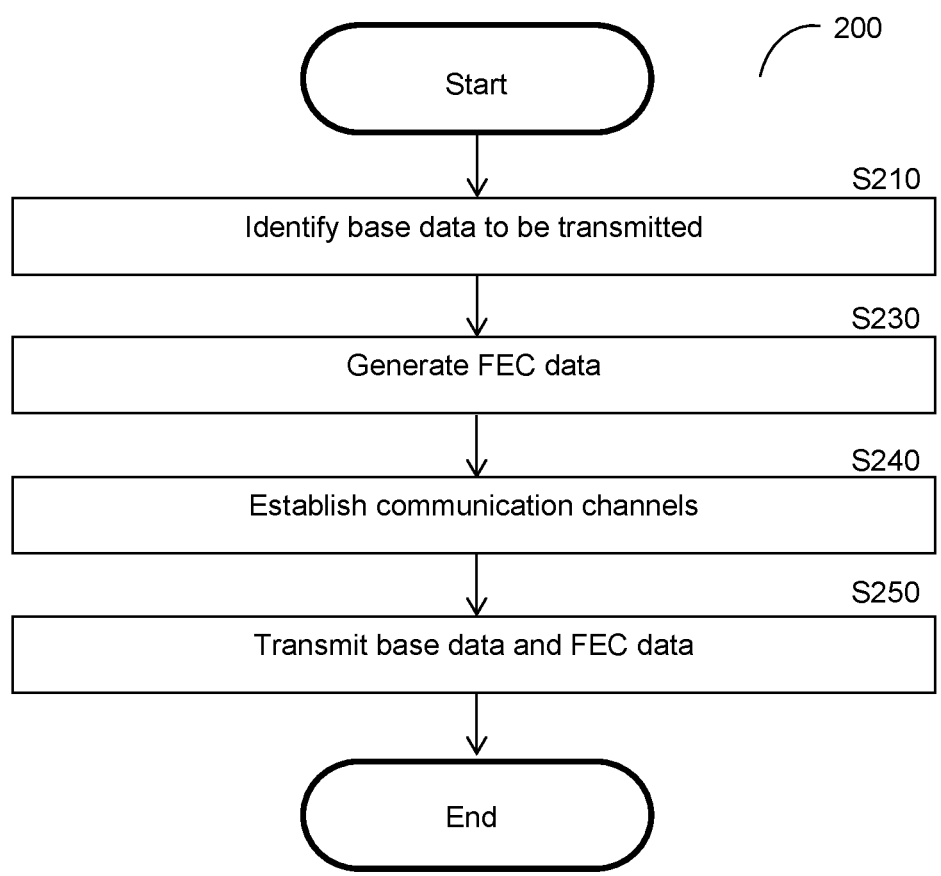
FIG. 2 is a flowchart illustrating a method for transmitting data for improved forward error correction according to an embodiment.

FIG. 2 is a flowchart 200 illustrating a method for transmitting data to be used for improved forward error correction according to an embodiment. In an embodiment, the method is performed by the sender device 110, FIG. 1.

At S210, base data to be transmitted is identified. The base data to be transmitted is data which may need to be reconstructed, for example, when errors are detected on the receiving side or when at least some of the base data has yet to be received on the receiving side.

At S220, FEC data is generated based on the base data identified at S210. The FEC data is generated such that the FEC data is redundant with at least a portion of the base data. Various embodiments including generation of FEC data are described below with respect to FIGS. 2-7. In particular, FIGS. 3 and 4 describe methods for generating FEC data based on compressed base data and generating FEC data over groups of packets, respectively.

At S230, communication channels are established. The communication channels are channels through which data is to be transmitted and may be realized via certain links, devices, networks, connection types (e.g., metered or non-metered), combinations thereof, portions thereof, and the like. Various disclosed embodiments selectively transmit data over different communication channels having certain properties in order to improve data transmission, reception, or other processing of the data. For example, FIG. 5 describes a method for sending base data over a first link and FEC data over a second link, FIG. 6 describes a method for sending FEC data over high latency network devices and at least some of the base data over low latency network devices, and FIG. 7 describes a method for sending FEC data over a non-metered connection and sending base data over a metered connection.

In some embodiments, multiple techniques may be utilized in combination. As a non-limiting example, FEC data may be sent using high latency network devices which are not subject to metered connection limitations (i.e., using high latency network devices to transmit data over non-metered connections), and at least some of the base data may be sent using low latency network devices over metered connections. Further, some embodiments may utilize different techniques for different portions of the data (e.g., sending some portions of the FEC data in accordance with one embodiment and sending other portions of the FEC data in accordance with another embodiment).

At S240, base data and FEC data are transmitted via the established communication channels. In an embodiment, the base data transmitted at S240 is or includes at least a portion of the base data identified at S210, and the FEC data is FEC data generated based on such base data at S220. In some embodiments disclosed herein, the FEC data and the base data may be sent via different channels or links, via different network devices, via connections with different metered statuses (e.g., metered or non-metered), combinations thereof, and the like.

Figure 3:
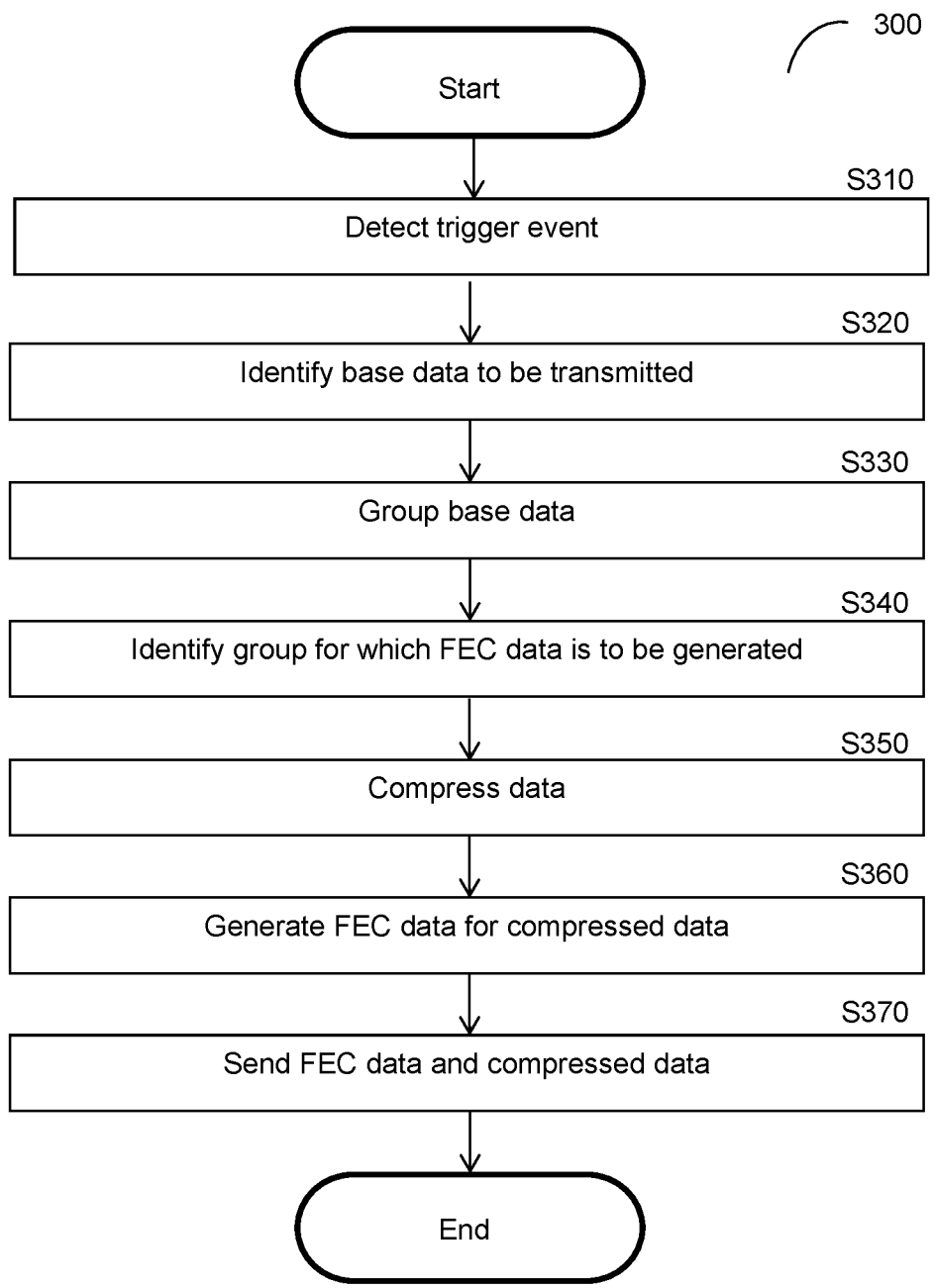
FIG. 3 is a flowchart illustrating a method for generating error correcting code using fountain coding techniques according to an embodiment.

FIG. 3 is a flowchart 300 illustrating a method for generating error correcting code using fountain coding techniques according to an embodiment. In an embodiment, the method is performed by the sender device 110, FIG. 1.

At optional S310, a trigger event is detected. The trigger event may be, but is not limited to, a change in connections (e.g., detecting that connections using different attributes of the same type have started being used), changes in network conditions, initialization of a system, combinations thereof, portions thereof, and the like.

Detection of the trigger event may be the trigger to begin generating FEC data as discussed in the following steps, or may otherwise be a trigger to alter the way in which FEC data is being generated. For example, the way in which the FEC data is being generated may be altered by changing the scheme used for grouping the base data, the scheme used for generating the FEC data, or both. In a further embodiment, the way in which the FEC data is generated may be changed based on a type of trigger event. As a non-limiting example, the way the base data is being grouped may be adjusted when network conditions change, and FEC data may begin being generated when a certain system is initialized. As another non-limiting example, a first scheme for grouping the base data is used when a first change in network conditions is detected, and a second scheme for grouping the base data is used when a different second change in network conditions is detected.

In an embodiment, the trigger event is detected based on the outputs of one or more machine learning or other artificial intelligence techniques. As a non-limiting example, S310 may include applying a machine learning model to features extracted from network communications data in order to identify a pattern, anomaly, or classification for at least a portion of the data which may relate to a predetermined trigger event defined with respect to possible outputs of the machine learning model. As another non-limiting example, S310 may include applying an artificial intelligence model trained to make decisions related to certain patterns which may be predictive of an upcoming future need to begin performing FEC techniques or to change the way FEC data is being generated based on network communications data. In this regard, such artificial intelligence or machine learning techniques may be utilized in order to detect changes in data that forecast situations where beginning to send FEC data or changing the way FEC data is being generated would improve performance, thereby allowing for adapting to such changes in advance to improve results of data transmission.

At S320, base data is grouped into groups of data. In an embodiment, S320 may include applying a fountain code in order to divide a stream of the base data into groups.

At S330, one or more groups for which FEC data is to be generated are identified. When the base data is be received as a stream, S330 may include selecting data received within a certain time period or otherwise up until a certain point in time.

At S340, portions of the base data among the groups identified at S330 are compressed in order to produce compressed data. The data is compressed such that the compressed data is smaller in size (e.g., fewer bits) than the original data prior to compression. When the base data is grouped, each group of base data may be compressed in order to result in groups of compressed data corresponding to respective groups of the base data. In an embodiment, S340 includes applying one or more compression techniques such as, but not limited to, transform coding, Lempel-Ziv compression, and the like.

At S350, FEC data is generated based on the compressed data. In an embodiment, the FEC data is generated such that it is at least partially redundant with the compressed data. Moreover, FEC data may be generated in groups based on respective groups of the compressed data such that each group of FEC data corresponds to a respective group of the compressed data.

In an embodiment, the FEC data is generated to be at least partially redundant with the compressed data among the identified groups of the base data. As a result, if the compressed data is compromised (e.g., during transit), the FEC data may be utilized in order to reconstruct at least a portion of the compressed data. Moreover, the compressed data and its corresponding FEC data (i.e., the FEC data which is redundant with that set of compressed data and may therefore be used to reconstruct the compressed data) may be sent without sending the original data (i.e., the base data prior to compression). Accordingly, in some embodiments, only the FEC data and the compressed data are sent rather than the FEC data and the base data.

In this regard, it has been identified that, during data compression (particularly when using lossy compression techniques), certain dependencies can be lost which may affect the ability to accurately reconstruct the data on the receiving end. By first compressing the data and then generating the FEC data based on the compressed data, errors in reconstructing the compressed data using the FEC data can be minimized.

It has further been identified that streams of data often have similarities between packets which may be leveraged in order to further improve reconstruction. That is, streams of data from the same source often include different portions of data with a large degree of overlap, for example, overlap in data related to the transmission itself (e.g., data in headers of packets, etc.). As a non-limiting example, packets of data created using the same protocol often have common data with each other. Recognizing that streams of data often have such overlapping data, it has been further identified that data can be grouped and compressed accordingly in order to reduce the total amount of compressed data for which FEC data will need to be generated. This, in turn, allows for more efficiently creating FEC data, for example, by achieving comparable FEC resiliency with less FEC data or otherwise by improving FEC resiliency (i.e., the amount or proportion of the base data which may be recovered using the FEC data).

At S360, the FEC data and the compressed data are sent to a destination. The sending may be performed in accordance with one or more of the disclosed embodiments such as, but not limited to, any of the embodiments described with respect to FIGS. 5 and 6.

Figure 4:
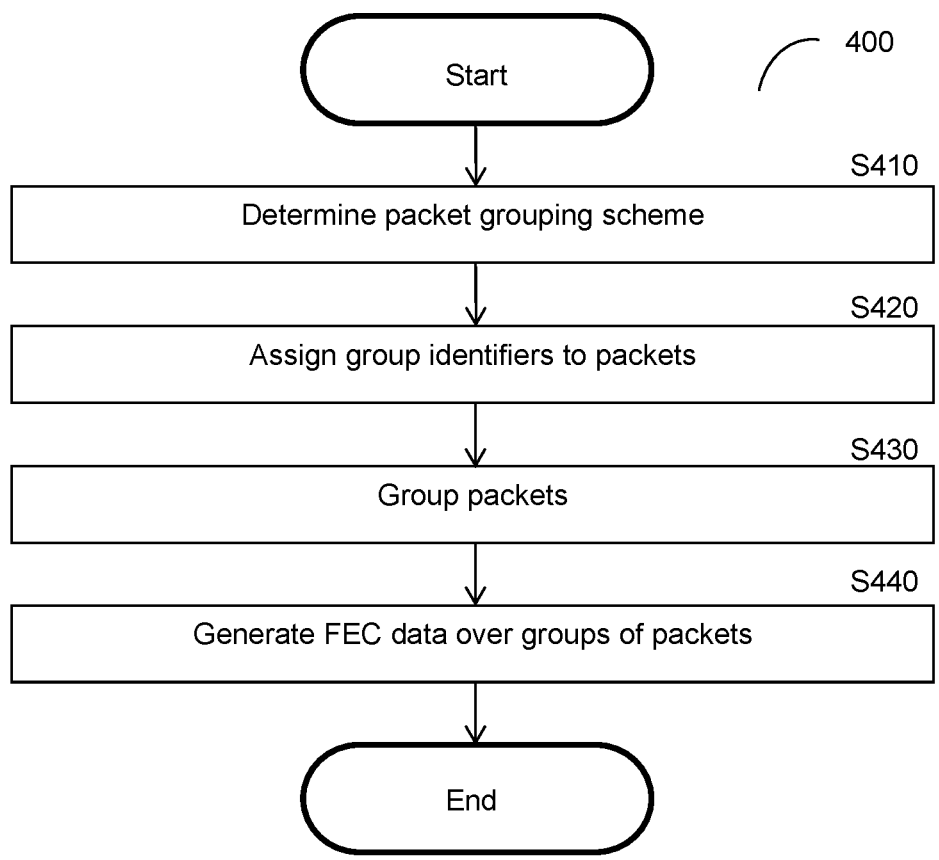
FIG. 4 is a flowchart illustrating a method for generating error correcting code using sliding windows according to an embodiment.

FIG. 4 is a flowchart 400 illustrating a method for generating error correcting code using sliding windows according to an embodiment. In an embodiment, the method is performed by the sender device 110, FIG. 1.

At S410, a packet grouping scheme is determined. In some embodiments, the packet grouping scheme may be determined according to a sliding window over a stream of incoming base data. The packet grouping scheme may be determined such that groups of packets are selected randomly, such that groups are selected in order to have at least some overlap (e.g., by ensuring that each packet of data appears in at least two groups such that FEC data generated for one group can be used to reconstruct that packet if the other group is lost during transit), combinations thereof, and the like.

The packet grouping scheme may further define parameters or otherwise define criteria for selection of packets for different groups. Such criteria may be defined with respect to factors such as, but not limited to, time (e.g., when the packet was received as part of the stream), FEC technique (i.e., which technique will be used to generate FEC data for that packet), combinations thereof, and the like.

At S420, group identifiers are assigned to packets according to the packet grouping scheme. As noted above, the packet grouping scheme may define criteria for grouping packets with respect to certain parameters. To this end, S420 may include analyzing the packets with respect to such criteria in order to determine groups for the packets, and group identifiers are assigned to packets based on their respective determined groups. Moreover, when a packet is selected for more than one group, S420 may include generating an additional instance of that packet and assigning the respective group identifier to each instance.

In a non-limiting example implementation, each group identifier corresponds to a combination value defined based on a port being used for that stream as well as some index. As a non-limiting example, a group identifier may be a 10-digit number including 4 digits corresponding to a given port and 6 digits of index value. In such an implementation, when grouping patents based on group identifier, packets having the same 4-digit port number in their group identifiers may be grouped together.

At S430, packets are grouped into groups of packets according to the packet grouping scheme. In an embodiment, the packets may be grouped according to their respective group identifiers.

At S440, FEC data is generated over the groups of packets.

In an embodiment, for packets among the base data which are in two or more groups (e.g., packets which are assigned group identifiers corresponding to two groups), a corresponding FEC packet instance may be created for each group the packet is in. That is, if a packet among the base data is included in two groups, two instances of the corresponding packet may be generated for that base data packet. By assigning packets to groups as discussed above, multiple FEC data packets may be created for base data packets assigned to multiple groups without requiring creating multiple instances of the base data packets themselves, thereby conserving processing and memory resources.

Figure 5:
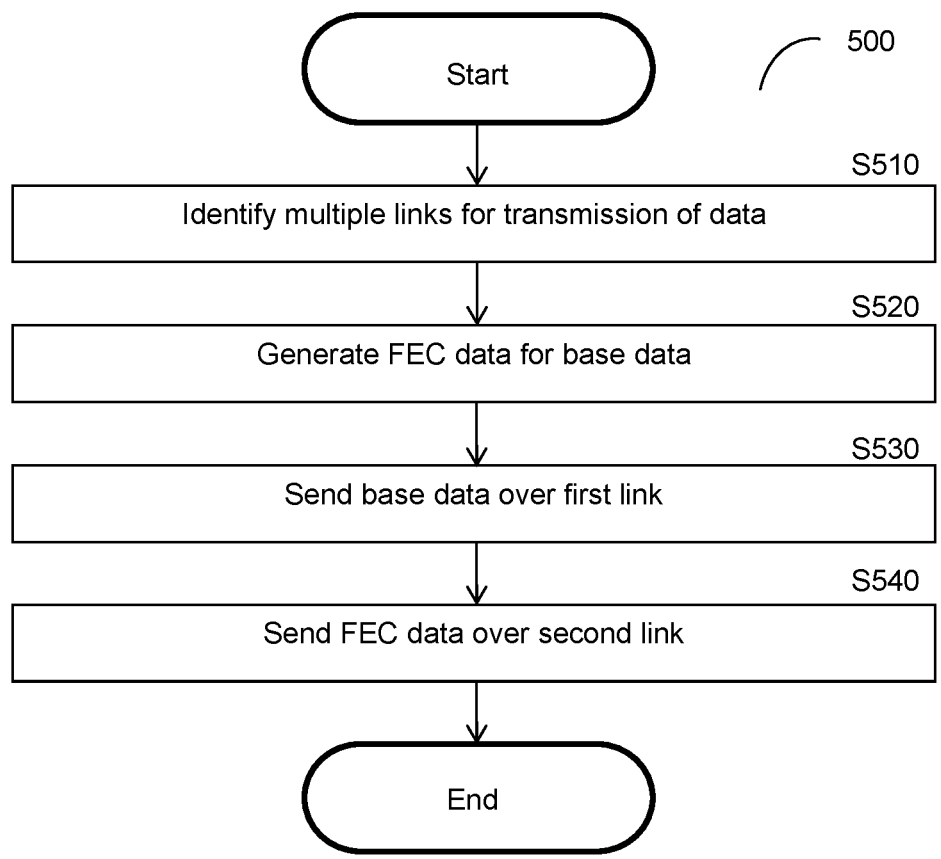
FIG. 5 is a flowchart illustrating a method for transmitting data for use in forward error correction over multiple links according to an embodiment.

FIG. 5 is a flowchart 500 illustrating a method for transmitting data for use in forward error correction over multiple links according to an embodiment. In an embodiment, the method is performed by the sender device 110, FIG. 1.

At S510, links are identified to be used for data transmission.

At S520, FEC data is generated based on a set of base data. In an embodiment, the FEC data is redundant with at least a portion of the base data.

At S530, a routing scheme for routing the base data and the FEC data is determined with respect to the identified links. In an embodiment, S530 includes identifying one or more first links through which the base data is to be sent and one or more second links through which the FEC data is to be sent.

In various embodiments, S530 may include applying one or more routing determination rules defined with respect to parameters related to performance of data transmitted via different links. As a non-limiting example, when links to multiple channels are available to a given sender device (e.g., the sender device 110, FIG. 1) and a first channel is either unstable or is stable but has a limit on the bitrate it can sustain, a link to that first channel may be utilized for transmitting FEC data and no base data may be sent via that link. This may be performed, for example, because loss of FEC data due to instability or bitrate caps will not affect performance significantly as compared to loss of base data such that stable or otherwise unlimited links may be more desirable for transmitting base data and unstable or limited links may provide acceptable quality performance for FEC data.

In an embodiment, the routing scheme may further be defined with respect to groups of data, e.g., groups of packets. More specifically, certain groups of data may correspond to each other. As a non-limiting example, each group of base data may have a corresponding group of FEC data. In a further embodiment, the routing scheme is determined such that groups of base data are sent via different links than their respective corresponding groups of FEC data.

In another embodiment, the routing scheme may be determined based on the amount base data and the amount of FEC data to be transmitted. In such an embodiment, the routing scheme may be determined so as to avoid overloading any given channel (e.g., by not transmitting an excessive amount of data through that channel via a respective link). To this end, the routing scheme may be further determined based on the amount of data being transmitted through different channels corresponding to the identified links. Moreover, the data may be distributed over those channels rather than transmitting the maximum amount of data possible via any individual channels even if it would be possible to transmit the same amount of data over a lower number of channels in order to minimize overloading channels in a manner which might affect performance, i.e., effectively balancing the load among those channels.

At S540, the base data is sent over one or more first links.

At S550, the FEC data is sent over one or more second links. As noted above, in some embodiments, groups of the FEC data corresponding to groups of the base data may be sent over different links than their respective corresponding base data groups such that the second link via which each group of FEC data is sent is a different link from the first link via which the corresponding group of base data is sent.

An example embodiment using metered and non-metered connections which may be realized by transmitting different data via different links in accordance with the method of FIG. 5 is described further below with respect to FIG. 7.

Figure 6:
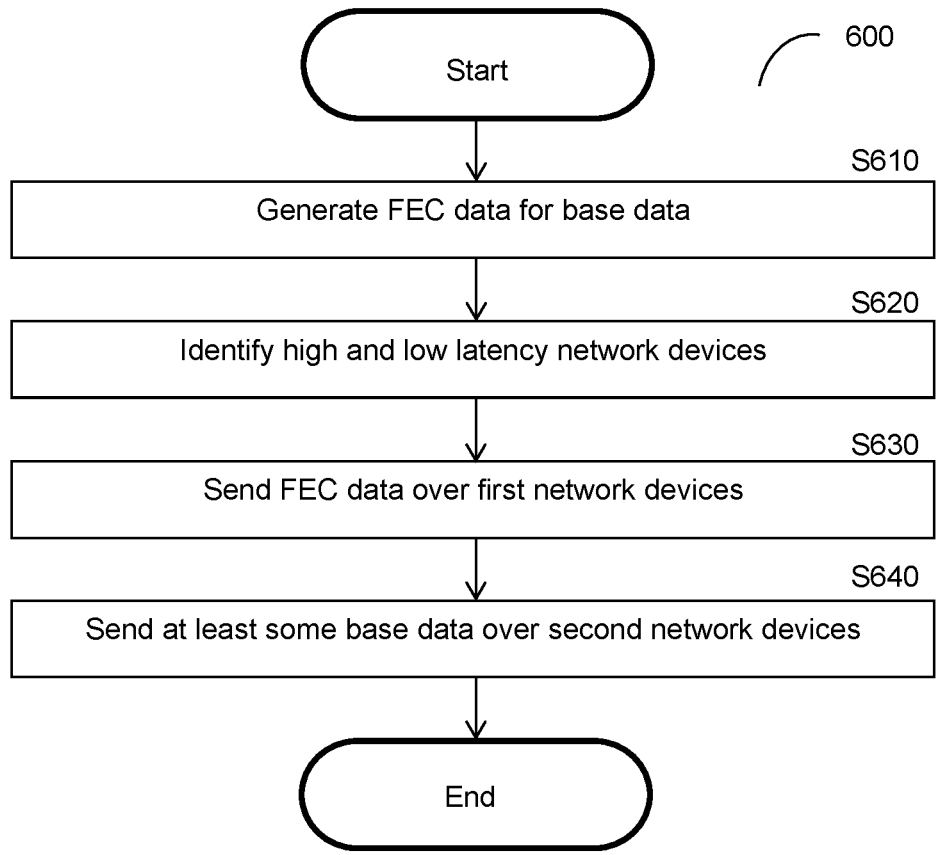
FIG. 6 is a flowchart illustrating a method for transmitting data for use as a smoothing mechanism in forward error correction according to an embodiment

FIG. 6 is a flowchart 600 illustrating a method for transmitting data for use as a smoothing mechanism in forward error correction according to an embodiment. In an embodiment, the method is performed by the sender device 110, FIG. 1.

At S610, FEC data is generated based on a set of base data. In an embodiment, the FEC data is redundant with at least a portion of the base data.

At S620, multiple network devices are identified. In an embodiment, at least some of the identified network devices are low latency network devices which transmit data with lower latency and at least some of the identified network devices are high latency network devices which transmit data with higher latency as compared to the low latency network devices. In a further embodiment, each low latency network device transmits data at a lower latency than each high latency network device. In a further embodiment, each low latency network device transmits data with a latency below a threshold, and each high latency network device transmits data with a latency above a threshold.

In some embodiments, the high latency network devices may transmit data at faster speeds than the low latency network devices. When FEC data is transmitted over the high latency network devices in accordance with such embodiments, the FEC data may be transmitted faster than at least a portion of the base data and, accordingly, may be used to reconstruct portions of the base data which are still in transit and otherwise have been received as base data containing detected errors. As a non-limiting example, data transmitted between the sender device 110 and the destination device 140 may be sent via a combination of modems including 2 modems which are faster, but high latency and 1 modem which is slower but lower latency. In such an example, portions of the base data may be transmitted between a first faster modem and the slower modem, while the FEC data may be transmitted via a second faster modem, and the destination device 140 may reconstruct portions of the base data sent via the first faster modem using the FEC data while the portions of the base data sent via the slower modem are still in transit.

At S630, the FEC data is sent over network devices having a first latency status. In an embodiment, the latency status is either high latency or low latency as described herein. In a further embodiment, a network device has a latency status of low latency when the latency at which the network device transmits data (e.g., an average latency or other known value representing latency of the network device) is below a threshold, and a network device has a high latency status when the latency at which the network device transmits data is above a threshold.

Which latency status to use for transmitting the FEC data and/or the base data may be determined based on one or more factors related to dependency of the network communications. To this end, S630 may include applying latency status determination rules defined according to known requirements for sending base data, FEC data, or both. As a non-limiting example, when confidence in the connection is high such that it is expected that there will not be significant errors in the base data being received, the FEC data may be determined to be sent via high latency network devices; otherwise, the FEC data is determined to be sent via low latency network devices. Such confidence may be determined, for example, based on one or more parameters related to data transmission (e.g., error rate) being above or below a threshold.

At S640, at least a portion of the base data is sent over network devices having a second latency status. In an embodiment, the second latency status is different from the first latency status. As a non-limiting example, when the first latency status is low latency, the second latency status is high latency. As another non-limiting example, when the first latency status is high latency, the second latency status is low latency.

In some embodiments, another portion of the base data may be sent over network devices having the first latency status such that some of the base data is sent over the network devices having the first latency status and some of the base data is sent over the network devices having the second latency status. As a non-limiting example, a portion of the base data may be sent alongside the FEC data via the high latency network devices, and the FEC data may be used for smoothing of that portion of the base data sent via the high latency network devices.

Figure 7:
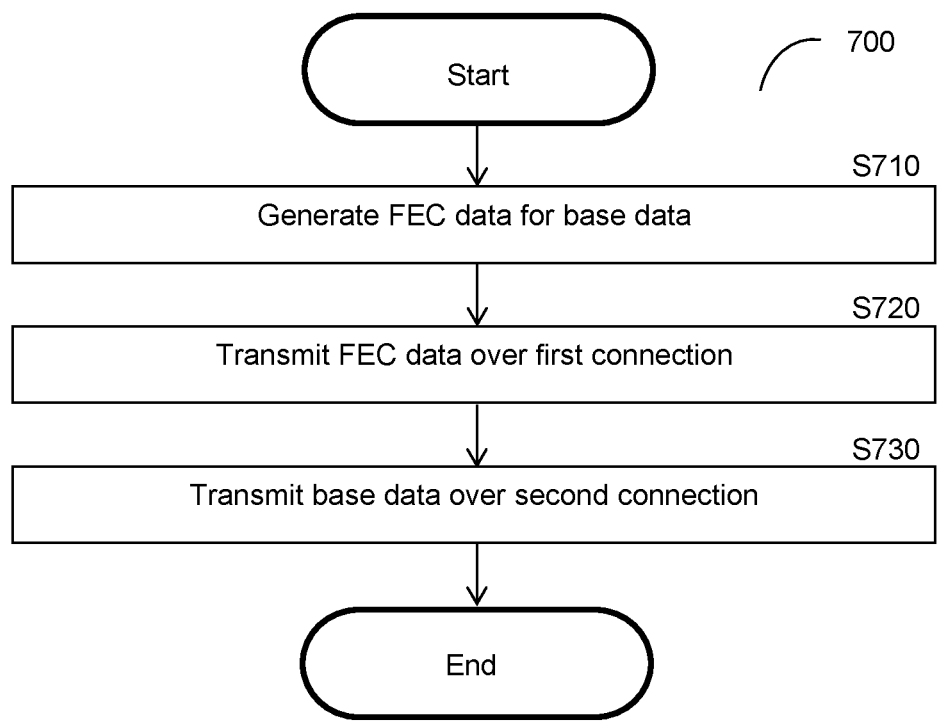
FIG. 7 is a flowchart illustrating a method for transmitting data for use in forward error correction metered and non-metered connections according to an embodiment

FIG. 7 is a flowchart 700 illustrating a method for transmitting data for use in forward error correction over multiple links according to an embodiment. In an embodiment, the method is performed by the sender device 110, FIG. 1.

At S710, FEC data is generated based on a set of base data. In an embodiment, the FEC data is redundant with at least a portion of the base data.

At S720, the FEC data is transmitted over a non-metered connection. In an embodiment, the non-metered connection is a connection which does not have a predetermined limit on the amount of data allowed to be sent via the connection in a given time period (e.g., a threshold amount of data which may be sent per month). In a further embodiment, the limit is an artificial limit placed on the amount of data rather than a limit due to logistical constraints (e.g., logistical constraints such as the amount of data that is practically possible to transmit via the connection in a given time period). In some implementations, a relatively high volume of FEC data (e.g., above a threshold amount over the base data or an amount that is a multiple greater than 1 of the base data) may be sent over the non-metered connection.

At S730, the base data is transmitted over a metered connection. In an embodiment, the metered connection is subject to a predetermined limit on the amount of data which may be transmitted via the metered connection in a given time period. As a non-limiting example, the metered connection may be a connection to a mobile data network via a mobile device which is subject to a data limit set by the service provider (e.g., 100 Gigabytes per month).

In this regard, it has been identified that base data usually has a finite or otherwise set amount of data to be transmitted, i.e., the amount of data needing to be transmitted among the base data is predetermined based on the amount of data received. The amount of FEC data to be transmitted, on the other hand, may vary. As a non-limiting example, the maximum possible amount of FEC data may be desired for a given implementation, but practical limits on generating and sending FEC data which vary over time may limit the total amount of FEC data to be sent. Transmitting base data over a metered connection with a predetermined limit and transmitting FEC data only over non-metered connections allows for more effectively managing the amount of data being sent over metered connections. It is further noted that, in various implementations, it may be desirable to have multiple channels available for redundancy purposes. Selectively using metered and non-metered connections in this manner allows for implementations where multiple channels including a channel having a metered connection and a channel having a non-metered connection can be more effectively utilized, thereby further improving quality of data transmissions.

Figure 8:
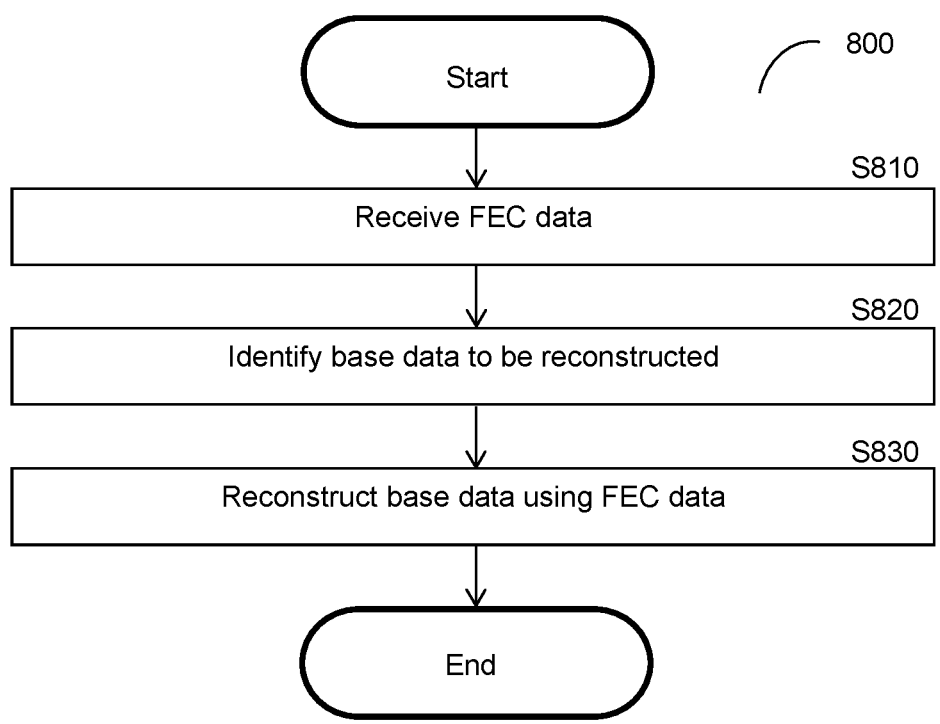
FIG. 8 is a flowchart illustrating a method for reconstructing data according to an embodiment.

FIG. 8 is a flowchart 800 illustrating a method for reconstructing data according to an embodiment. In an embodiment, the method is performed by the destination device 140, FIG. 1.

At S810, FEC data is received, for example, from a sender device such as the sender device 110, FIGS. 1A-B. In an embodiment, the FEC data is redundant with at least a portion of base data. The FEC data may be generated as described above with respect to one or more of the embodiments described with respect to any of FIGS. 2-7.

At S820, at least a portion of base data to be reconstructed is identified. The at least a portion of base data may be or may include, but is not limited to, at least a portion of the base data received with the FEC data, at least a portion of the base data received over different links or channels than the FEC data, and the like.

At S830, at least a portion of the base data is reconstructed using the FEC data. As noted above, in some embodiments, the FEC data may be utilized to reconstruct at least some of the base data regardless of whether errors are detected in the portions of the base data received at S810 in order to effectively utilize the FEC data for smoothing, thereby reducing jitter, latency, and the like.

It should be noted that detection of a trigger event is depicted as a first step in FIG. 3 for example purposes, and that various disclosed embodiments may begin or otherwise be affected by a trigger event as described herein. In particular, in some embodiments, any or all of the processes described with respect to FIGS. 2 through 8 may be initialized in response to a trigger event. Moreover, in a further embodiment, which processes among the processes described with respect to FIGS. 2 through 8 may be determined based on a type of trigger event.

Figure 9:
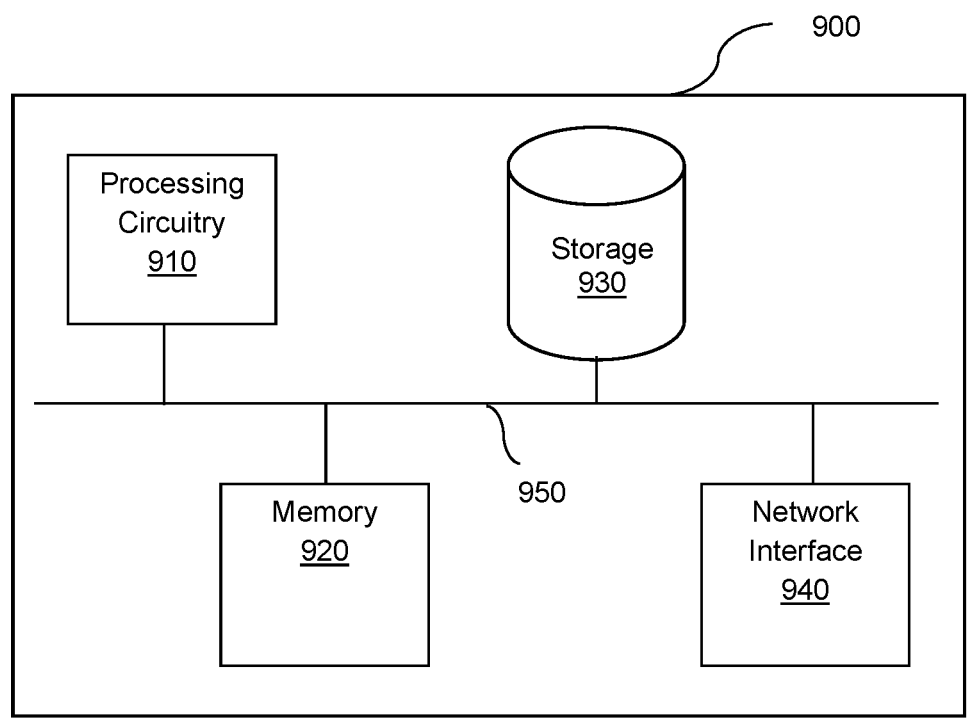
FIG. 9 is a schematic diagram of a hardware layer according to an embodiment.

FIG. 9 is a schematic diagram of a hardware layer 900 according to an embodiment. The hardware layer may be utilized as the hardware layer of the sender device 110, the destination device 140, both, and the like. The hardware layer 900 includes a processing circuitry 910 coupled to a memory 920, a storage 930, and a network interface 940. In an embodiment, the components of the hardware layer 900 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the hardware layer 900 to communicate with, for example, the connections 120 and 130, the network devices 150 and 160, the sender device 110, the destination device 140, and the like, depending on the implementation.

It should be understood that the embodiments described herein are not limited to the specific architecture illustrated in FIG. 9, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for forward error correction, comprising:
   detecting a trigger event;
   grouping a set of base data into a plurality of base data groups based on the detected trigger event and a set of contextual data indicating at least one transmission-affecting circumstance;
   generating forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and
   transmitting the plurality of FEC data groups.

2. The method of claim 1, wherein the FEC data is generated based further on the set of contextual data.

3. The method of claim 1, wherein detecting the trigger event further comprises:
   analyzing at least one network performance measurement in order to detect an abnormality in network performance.

4. The method of claim 1, wherein at least a portion of the base data is generated by a first software component, wherein at least a portion of the FEC data is generated by a second software component.

5. The method of claim 4, wherein each of the first software component and the second software component is a process.

6. The method of claim 1, further comprising:
   transmitting the plurality of base data groups, wherein each FEC group is transmitted via a different channel than the corresponding base data group.

7. The method of claim 1, further comprising:
   compressing the plurality of base data groups in order to create a plurality of respective compressed data groups, wherein the plurality of FEC data groups are generated based further on the plurality of compressed data groups such that each FEC data group is redundant with at least a portion of the respective compressed data group of the corresponding base data group.

8. The method of claim 1, further comprising:
   assigning a group identifier to each of the plurality of base data groups, wherein the plurality of FEC data groups is generated based further on the group identifiers.

9. The method of claim 1, wherein the plurality of FEC data groups is transmitted over at least one first connection, wherein the plurality of base data groups is transmitted over at least one second connection, the at least one first connection having a first attribute of a type of attribute, the at least one second connection having a second attribute of the type of attribute, wherein at least the base data is grouped based on the first attribute of the at least one first connection and the second attribute of the at least one second connection.

10. The method of claim 9, wherein each second connection has a predetermined limit on an amount of data transmitted via the second connection in a given time period.

11. The method of claim 1, wherein the plurality of FEC data groups is transmitted over at least one first network device, wherein at least a portion of the plurality of base data groups is transmitted over at least one second network device.

12. The method of claim 11, wherein each first network device transmits data with a higher latency than each second network device.

13. The method of claim 11, wherein each first network device transmits data with a lower latency than each second network device.

14. The method of claim 1, wherein the FEC data is utilized to construct at least a first portion of the base data while at least a second portion of the base data is still in transit.

15. A non-transitory computer readable medium having stored thereon instructions for causing a processing circuitry to execute a process, the process comprising:
    detecting a trigger event;
    grouping a set of base data into a plurality of base data groups based on the detected trigger event and a set of contextual data indicating at least one transmission-affecting circumstance;
    generating forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and
    transmitting the plurality of FEC data groups.

16. A system for forward error correction, comprising:
    a processing circuitry; and
    a memory, the memory containing instructions that, when executed by the processing circuitry, configure the system to:
        detect a trigger event;
        group a set of base data into a plurality of base data groups based on the detected trigger event and a set of contextual data indicating at least one transmission-affecting circumstance;
        generate forward error correction (FEC) data including a plurality of FEC data groups based on the plurality of base data groups, wherein each FEC data group corresponds to a respective base data group of the plurality of base data groups, wherein each FEC data group is redundant with at least a portion of the corresponding base data group; and
        transmit the plurality of FEC data groups.

17. The system of claim 16, wherein the system is further configured to:
    compress the plurality of base data groups in order to create a plurality of respective compressed data groups, wherein the plurality of FEC data groups are generated based further on the plurality of compressed data groups such that each FEC data group is redundant with at least a portion of the respective compressed data group of the corresponding base data group.

18. The system of claim 16, wherein the system is further configured to:
    assign a group identifier to each of the plurality of base data groups, wherein the plurality of FEC data groups is generated based further on the group identifiers.

19. The system of claim 16, wherein the plurality of FEC data groups is transmitted over at least one first connection, wherein the plurality of base data groups is transmitted over at least one second connection, the at least one first connection having a first attribute of a type of attribute, the at least one second connection having a second attribute of the type of attribute, wherein at least the base data is grouped based on the first attribute of the at least one first connection and the second attribute of the at least one second connection.

20. The system of claim 16, wherein the plurality of FEC data groups is transmitted over at least one first network device, wherein at least a portion of the plurality of base data groups is transmitted over at least one second network device.

21. The system of claim 16, wherein the FEC data is utilized to construct at least a first portion of the base data while at least a second portion of the base data is still in transit.

* * * * *